United States Patent
Najork et al.

(10) Patent No.: US 6,377,984 B1
(45) Date of Patent: *Apr. 23, 2002

(54) WEB CRAWLER SYSTEM USING PARALLEL QUEUES FOR QUEING DATA SETS HAVING COMMON ADDRESS AND CONCURRENTLY DOWNLOADING DATA ASSOCIATED WITH DATA SET IN EACH QUEUE

(75) Inventors: Marc Alexander Najork, Palo Alto; Clark Allan Heydon, San Francisco, both of CA (US)

(73) Assignee: Alta Vista Company, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/433,004

(22) Filed: Nov. 2, 1999

(51) Int. Cl.[7] .................. G06F 15/16; G06F 15/173
(52) U.S. Cl. .................. 709/217; 709/201; 709/226
(58) Field of Search .................. 709/217, 226, 709/219, 201, 234, 235, 236, 237; 707/7, 10; 710/52, 53, 54, 55, 56; 370/229, 230

(56) References Cited

U.S. PATENT DOCUMENTS

| | | | | | |
|---|---|---|---|---|---|
| 5,386,551 | A | * | 1/1995 | Chikira et al. | 714/46 |
| 5,633,858 | A | * | 5/1997 | Chang et al. | 370/255 |
| 5,680,622 | A | * | 10/1997 | Even | 395/709 |
| 5,748,954 | A | * | 5/1998 | Mauldin | 707/10 |
| 5,793,747 | A | * | 8/1998 | Kline | 370/230 |
| 5,835,763 | A | * | 11/1998 | Klein | 395/671 |
| 5,878,233 | A | * | 3/1999 | Schloss | 709/225 |
| 5,881,269 | A | * | 3/1999 | Dobbelstein | 703/21 |
| 5,924,097 | A | * | 7/1999 | Hill et al. | 707/10 |
| 5,937,162 | A | * | 8/1999 | Funk et al. | 709/206 |
| 5,974,455 | A | * | 10/1999 | Monier | 709/223 |
| 5,974,481 | A | * | 10/1999 | Broder | 710/49 |
| 5,999,964 | A | * | 12/1999 | Murakata et al. | 709/201 |
| 6,002,785 | A | * | 12/1999 | Ucida | 382/124 |
| 6,067,543 | A | * | 5/2000 | Burrows | 707/4 |
| 6,067,566 | A | * | 5/2000 | Moline | 709/219 |
| 6,137,549 | A | * | 10/2000 | Rasson et al. | 348/906 |
| 6,144,637 | A | * | 11/2000 | Calvignac et al. | 370/229 |
| 6,182,085 | B1 | * | 1/2001 | Eichstaedt et al. | 707/104 |
| 6,216,167 | B1 | * | 4/2001 | Momirov | 709/238 |
| 6,222,822 | B1 | * | 4/2001 | Geradin et al. | 370/230 |

* cited by examiner

Primary Examiner—Le Hien Luu
Assistant Examiner—Bunjob Jaroenchonwanit
(74) Attorney, Agent, or Firm—Pennie & Edmonds LLP (57) ABSTRACT

A method and system for scheduling downloads in a web crawler. A web crawler may use multiple threads to download documents from the world wide web. Both threads and queues are identified by numerical ID's. Each thread in the web crawler is assigned to dequeue from a queue until the assigned queue is empty. Each thread enqueues URL's as new URL's are discovered in the course of downloading web pages. In one embodiment, when a thread discovers a new URL, a numerical function is performed on the URL's host component to determine the queue in which to enqueue the new URL. In another embodiment, each queue in a web crawler may be dynamically assigned to a host computer so that URL's enqueued into the same queue all have the same host component. When a queue becomes empty, a new host may be dynamically assigned to it. In both embodiments, when all the threads are dequeuing in parallel from each of the respectively assigned queues, no more than one request to one host computer is made at the same time.

36 Claims, 9 Drawing Sheets

WEB CRAWLER SYSTEM USING PARALLEL QUEUES FOR QUEING DATA SETS HAVING COMMON ADDRESS AND CONCURRENTLY DOWNLOADING DATA ASSOCIATED WITH DATA SET IN EACH QUEUE

The present invention relates to a system and method for accessing documents, called web pages, on the world wide web (WWW) and, more particularly, to a method for scheduling web crawlers to efficiently download web pages from the world wide web.

BACKGROUND OF THE INVENTION

Documents on interconnected computer networks are typically stored on numerous host computers that are connected over the networks. For example, so-called "web pages" are stored on the global computer network known as the Internet, which includes the world wide web. Each web page on the world wide web has a distinct address called its uniform resource locator (URL), which identifies the location of the web page. Most of the documents on the world wide web are written in standard document description languages (e.g., HTML, XML). These languages allow an author of a document to create hypertext links to other documents. Hypertext links allow a reader of a web page to quickly move to other web pages by clicking on their respective links. These links are typically highlighted in the original web page. A web page containing hypertext links to other web pages generally refers to those pages by their URL's. Links in a web page may refer to web pages that are stored in the same or different host computers.

A web crawler is a program that automatically finds and downloads documents from host computers in networks such as the world wide web. When a web crawler is given a set of starting URL's, the web crawler downloads the corresponding documents, then the web crawler extracts any URL's contained in those downloaded documents and downloads more documents using the newly discovered URL's. This process repeats indefinitely or until a predetermined stop condition occurs. As of 1999 there were approximately 500 million web pages on the world wide web and the number is continuously growing; thus, web crawlers need efficient data structures to keep track of downloaded documents and any discovered addresses of documents to be downloaded. One common data structure to keep track of addresses of documents to be downloaded is a first-in-first-out (FIFO) queue. Using FIFO queues, URL's are enqueued as they are discovered, and dequeued in the order enqueued when the crawler needs a new URL to download.

A high-performance web crawler typically has the capability to download multiple documents in parallel, either by using asynchronous I/O or multiple threads. A thread is an abstraction for an execution entity within a running computer program. When a running computer program is composed of more than one thread, the program is said to be "multi-threaded." The threads of a multi-threaded program run in parallel and share the same memory space, but each thread in a multi-threaded program executes independently of the others. Each thread in a multi-threaded program has its own program counter and stack.

Discovered URL's from any particular web page often tend to refer to documents located on the same host computer. Therefore, if a FIFO queue is used by a web crawler to store those discovered URL's, sequentially dequeued URL's could cause multiple parallel requests to the same host computer. Sending multiple parallel requests to the same host computer may overload the host, diminishing its responsiveness to page requests, or may even cause the host to crash, either of which may create a bottleneck in the web crawl and reduce the crawler's effective parallel processing.

Examples of known prior art methods aimed at preventing the issuance of multiple parallel requests to one host computer include the Internet Archive web crawler and the Scooter web crawler used by AltaVista.

The Internet Archive crawler keeps a separate FIFO queue per web host. During a crawling process, 64 FIFO queues are selected and assigned to the process. The 64 queues are processed in parallel with the crawler dequeuing one URL at a time from each queue and downloading the corresponding document. This process ensures that no more than one URL from each queue is downloaded at a time and that the crawler makes at most one request to each host computer at a time. The FIFO queues in the Internet Archive web crawler have a one-to-one correspondence with the number of web hosts on the Internet; therefore, this approach requires a staggering number of queues, easily several million. However, this approach only processes 64 queues at a time; thus, not only are millions of queues sitting idle, this process also puts a prolonged load on a small fraction of the Internet's web hosts.

The Scooter web crawler used by AltaVista uses a different approach. Scooter keeps a first list of URL's of web pages to be downloaded, and a second list of host computers from which downloads are in progress. Newly discovered URL's are added to the end of the first list. To locate a new URL to download, Scooter compares items in the first list with the second list until it finds a URL whose host computer is not in the second list. Scooter then removes that URL from the first list, updates the second list, and downloads the corresponding document. One of the disadvantages of this approach is the time wasted scanning through the first list of URL's each time a thread in the crawler is ready to perform a download.

This present invention provides more efficient web page downloading methods that avoid certain of the disadvantages and inefficiencies in the prior art methods.

SUMMARY OF THE INVENTION

The present invention provides a method and system for downloading data sets from among a plurality of host computers.

A given set of web pages typically contains addresses or URL's of one or more other web pages. Each address or URL typically includes a host address indicating the host computer of the particular web page. Addresses or URL's discovered during the process of downloading data sets are enqueued into a number of queues based on predetermined policies.

In this invention, a web crawler may have multiple first-in-first-out (FIFO) queues and use multiple threads to dequeue from those queues and to download documents from the world wide web. Each queue is assigned a single, fixed thread that dequeues URL's from that queue until it becomes empty. While a thread dequeues URL's from its assigned queue, it also enqueues any URL's discovered during the course of processing downloaded documents. In the exemplary embodiments, all URL's with the same host component are enqueued in the same queue. As a result, when all the threads are dequeuing in parallel from each of their respectively assigned queues, no more than one request to one host computer is made at the same time.

In a first exemplary embodiment, when a thread discovers a new URL (i.e., in a document it has downloaded from a web site), a numerical function is performed on the URL's host component to determine the queue in which to enqueue the new URL. Each queue may contain URL's referring to documents stored on different host computers; however, as stated previously, URL's referring to documents stored on the same host computer are always enqueued into the same queue.

In a second exemplary embodiment, the mechanism for enqueuing URL's is based on a dynamic assignment of hosts to queues. When a new URL is discovered, the new URL is generally first enqueued into a main FIFO queue, and is later enqueued into one of the underlying FIFO queues based on the dynamic assignment of hosts to queues. However, if the main queue is empty, the new URL may be directly enqueued into one of the underlying queues. In this embodiment, not only are all URL's having the same host component enqueued into the same underlying queue, but all URL's in any particular one of the underlying queues have the same host component.

In the second exemplary embodiment, in which hosts are dynamically assigned to queues, when one of the underlying queues becomes empty, a different host may be assigned to it. For example, when a queue becomes empty, the empty queue's corresponding thread begins enqueuing URL's from the main queue into the underlying queues until the thread finds a URL whose corresponding host is not yet assigned to any underlying queue. The host of the new URL is assigned to the empty queue, and the new URL is enqueued into that queue in accordance with the new assignment. If the main queue becomes empty, the thread becomes idle and is blocked.

Both embodiments allow for the case where there are more queues than threads, in which case some threads will be assigned to dequeue from a set of multiple queues. In such embodiments, each thread dequeues URL's from each of its assigned queues until each of those queues becomes empty.

DETAILED DESCRIPTION OF PREFERRED EMBODIMENTS

Figure 1:
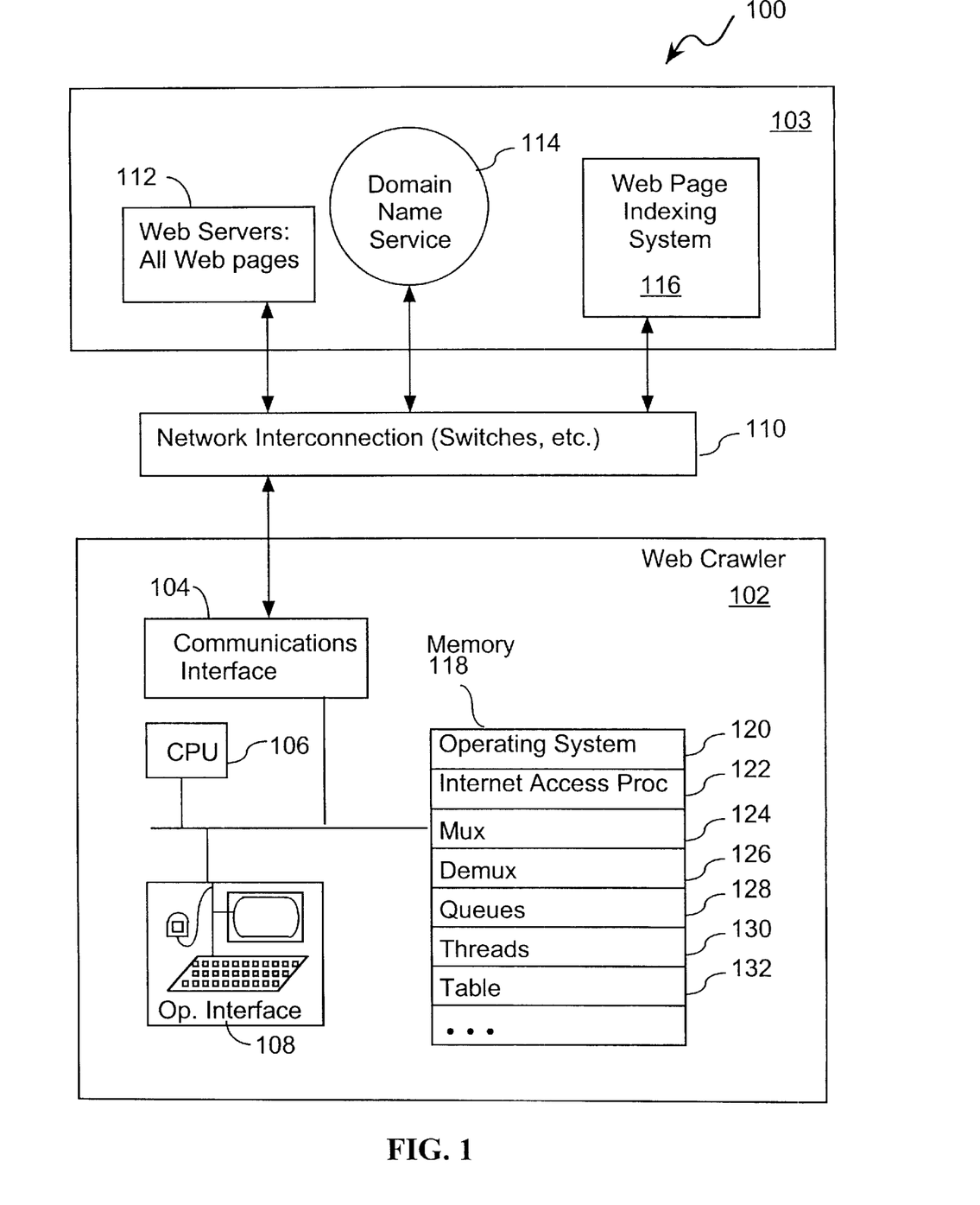
FIG. 1 is a block diagram of a distributed computer system illustrating an exemplary embodiment of the invention.

FIG. 1 shows an exemplary embodiment of a distributed computer system 100. The distributed computer system 100 includes a web crawler 102 connected to a network 103 through a network interconnection 110. The network 103 may be a global communication network, such as the Internet, or a private network, sometimes called an Intranet. Examples of the network interconnection 110 include switches, routers, etc.

The Internet network 103 includes web servers 112 and a service known as a domain name system 114. It may also optionally include a web page indexing system 116. The web servers 112 store web pages. The domain name system 114 is a distributed database that provides the mapping between Internet protocol (IP) addresses and hostnames. The domain name system 114 is a distributed system because no single site on the Internet has the domain name mapping information for all the web servers in the network. Each site participating in the domain name system 114 maintains its own database of information and runs a server program that other systems across the Internet can query. The domain name system provides the protocol that allows clients and servers to communicate with each other. Any application may look up the IP address (or addresses) corresponding to a given hostname or the hostname corresponding to a given IP address in the domain name system 114. An application accesses the domain name system 114 through a resolver. The resolver contacts one or more name servers to perform a mapping of a hostname to the corresponding IP address, or vice versa. A given hostname may be associated with more than one IP address because an Internet host may have multiple interfaces, with each interface of the host having a unique IP address. Also, a host may be replicated on multiple computers, each having its own IP address, but providing access to the same information.

The web page indexing system 116 includes an index of words used on the world wide web and addresses of the web pages that use each word. Such indexing systems are maintained by various search engines, such as the AltaVista search engine. The domain name system 114 and the web page indexing system 116 may be accessed by the web crawler 102 in the process of downloading web pages from the world wide web.

The web crawler 102 includes a communications interface 104, one or more central processing units (CPU's) 106, an operator interface 108 (which may be remotely located on another computer) and memory 118. In the preferred embodiment, the communications interface 104 is able to handle overlapping communication requests. The memory 118 includes:

- a multitasking operating system 120;
- an Internet access procedure 122 for fetching web pages as well as communicating with the domain name system 114;
- a multiplexer (mux) procedure 124 used by threads 130 for dequeuing URL's from the queues 128;
- a demultiplexer (demux) procedure 126 used by the threads for enqueuing URL's on the queues 128;
- queues 128 for storing addresses of web pages to be downloaded;
- threads 130 for downloading web pages from the servers 112, and processing the downloaded web pages; and
- a host-to-queue assignment table 132 for recording dynamic assignments of host identifiers to the queues 128.

In a first embodiment the assignment table 132 is not used at all. In a second embodiment, the host-to-queue assignment table 132 is both used and updated by the demux and mux procedures 126, 124.

Given a set of URL's, the web crawler 102 enqueues the URL's into appropriate queues 128. Multiple threads 130 are used to dequeue URL's out of the queues 128, to download the corresponding documents or web pages from the world wide web and to extract any new URL's from the downloaded documents. Any new URL's are enqueued into the queues 128. This process repeats indefinitely or until a predetermined stop condition occurs, such as when all URL's in the queues have been processed and thus all the queues are empty. In continuous web crawler embodiments, there is no such stop condition. Multiple threads 130 are used to simultaneously enqueue and dequeue URL's from multiple queues 128. During the described process, the operating system 120 executes an Internet access procedure 122 to access the Internet through the communications interface 104.

Figure 2:
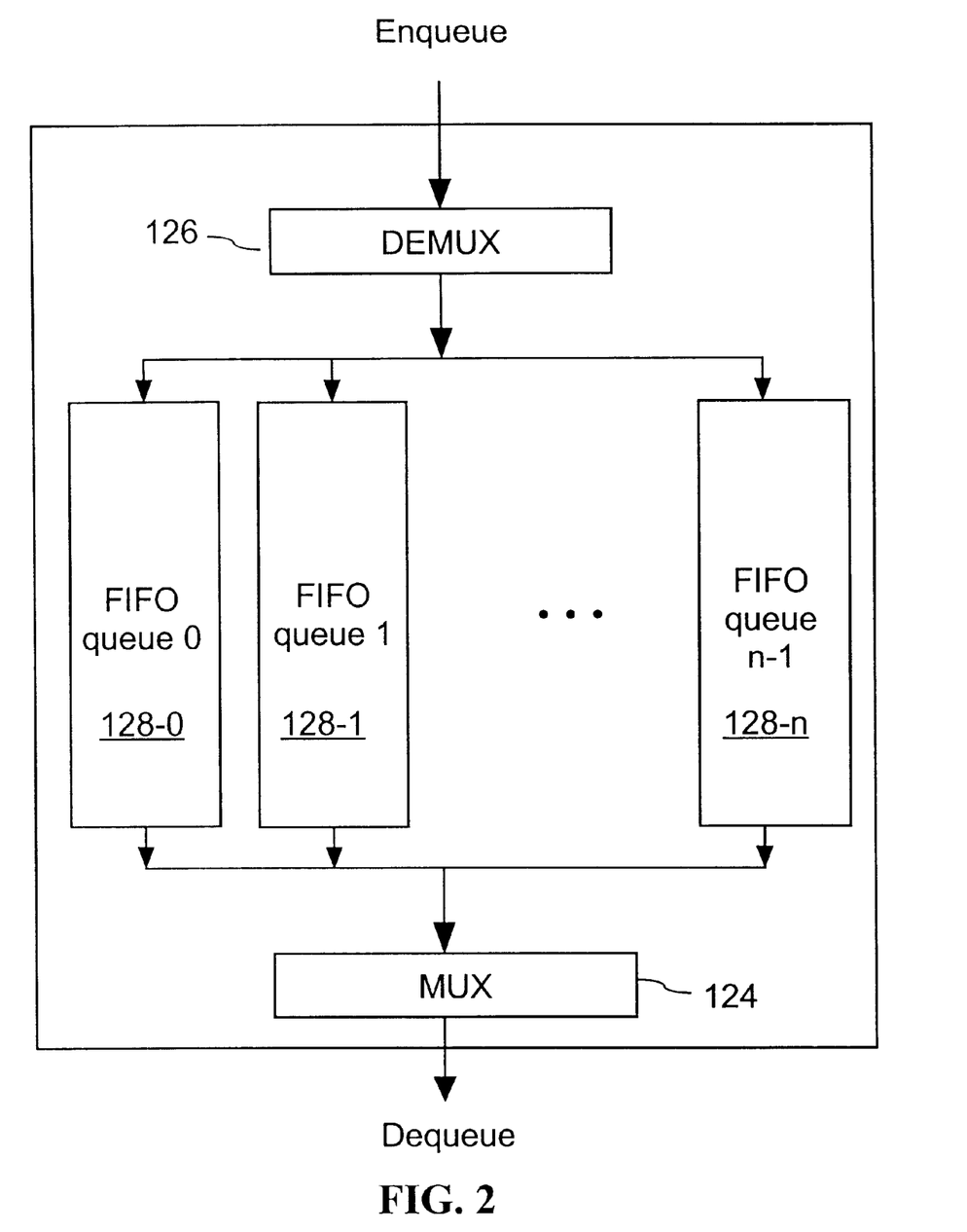
FIG. 2 is a block diagram illustrating an exemplary embodiment of the invention.

FIG. 2 illustrates the relationships between a set of "n" first-in-first-out (FIFO) queues 128 and the demux and mux procedures 126, 124 in a first exemplary embodiment of the present invention. When a new URL is discovered, the new URL is passed to the demux 126. The demux 126 enqueues the new URL into an appropriate queue based on a predetermined policy. In particular, URL's having the same associated host component are enqueued into the same queue. (Note that since there are typically many more hosts than queues, the URL's in any given queue will in general correspond to documents on a variety of hosts.) When a thread 130 is ready to dequeue from one of the queues 128, the head URL in the queue assigned to that thread is dequeued from that queue by the mux 124 and is passed to the thread for processing.

Figure 3A:
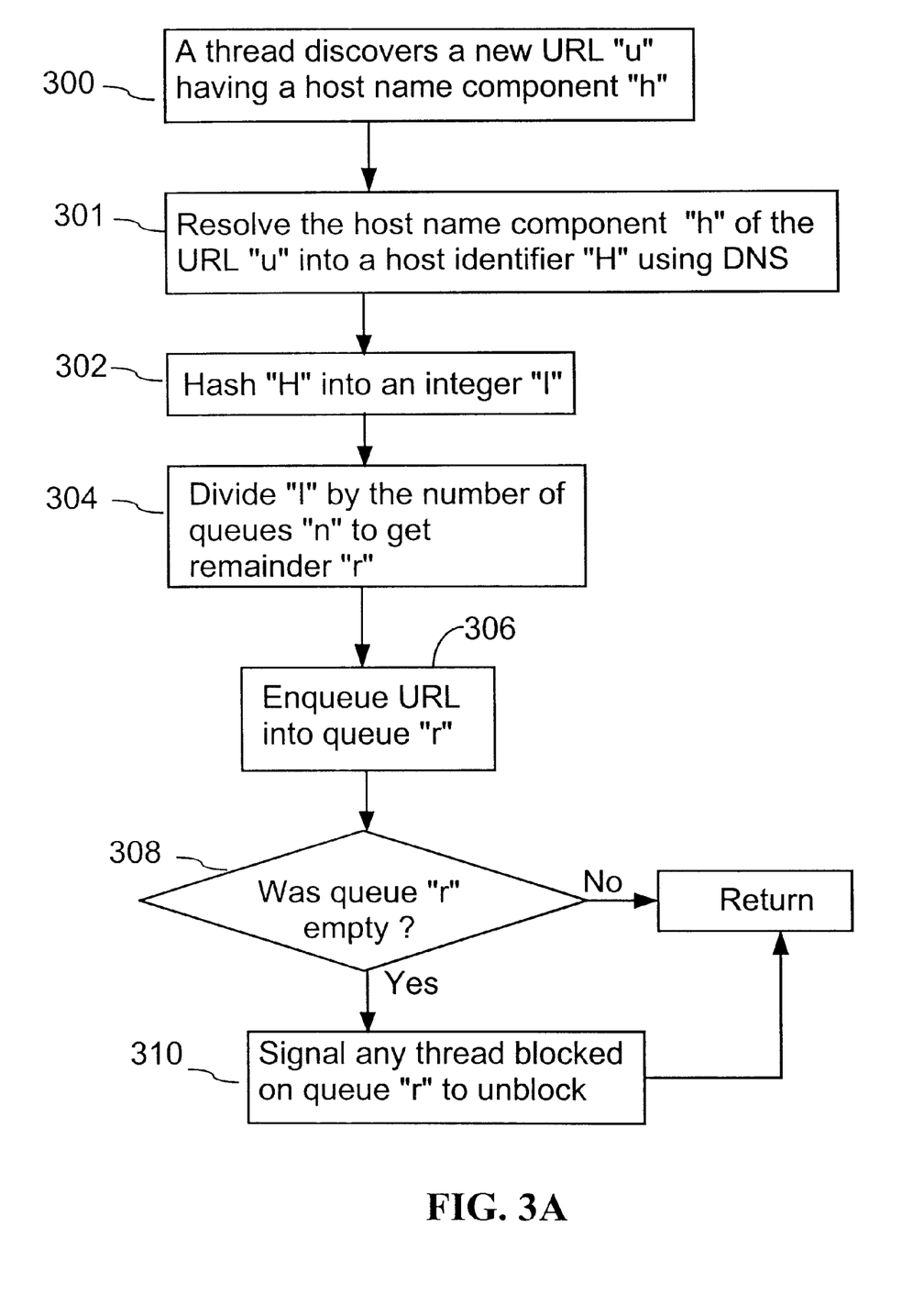
FIGS. 3A and 3B are flow charts depicting a first exemplary embodiment of the invention.

FIG. 3A is a flow chart illustrating the process, in the first exemplary embodiment of the present invention, for enqueuing URL's into a set of "n" queues using a set of "n" threads. In this exemplary process, both the threads and queues are identified by numerical ID's. For example, when the thread with ID "i" invokes the "dequeue" operation, the first item of the underlying queue "i" is dequeued and returned. A thread discovers a new URL "u" having a host name component "h" during the course of downloading web pages (step 300). The host name component "h" of the URL "u" is resolved into a host identifier "H" using the domain name system 114 (step 301). The resolved host identifier is preferably a canonical name or a canonical IP address for the host. Step 301 maps all the host names associated with an Internet host to the same host identifier. Without step 301, the URL's associated with a single host might be assigned to multiple queues. That could cause the web crawler to submit multiple overlapping download requests to the host, which would violate one of the principle goals of this invention.

The host identifier "H" of the new URL "u" is mapped into a queue identifier "r" using a suitable numerical function. For example, in one preferred implementation a fingerprint function is used to hash the host identifier "H" into an integer "I" (step 302). The integer "I" is divided by the number of queues in the system, such as "n", to get a remainder "r" between 0 and n−1 (step 304). In other words, r is set equal to the fingerprint of H modulo n. Examples of other possible numerical functions that could be used to map the host identifier into a queue identifier are checksum and hash functions.

Having selected queue "r," the new URL "u" is enqueued into queue "r" (step 306). If queue "r" was empty immediately before the new URL "u" was enqueued on it, (308-Yes), then the system signals any thread blocked on queue "r" to unblock (step 310) and returns. If queue "r" was not empty (308-No), the procedure simply returns.

Figure 3B:
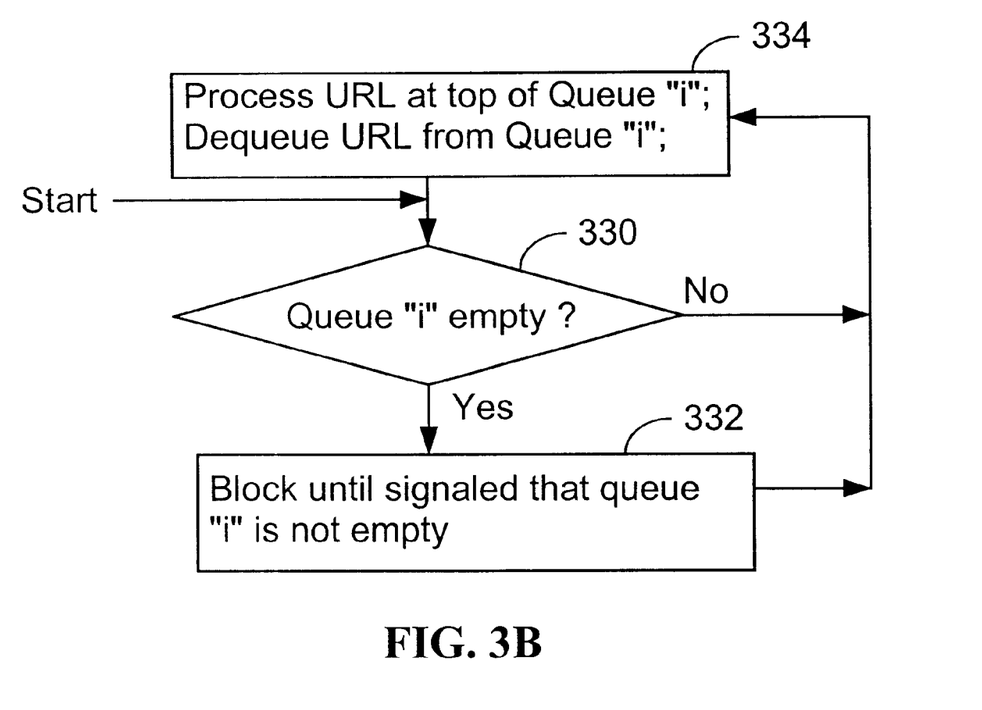

Referring to FIG. 3B, each thread of the web crawler processes the URL's in one queue. More specifically, the thread checks to see if its associated queue is empty (330). If so, it blocks until it is signaled by another thread that there is at least one URL in the queue (332). It then downloads and processes the web page identified by the head URL in the queue, and then dequeues the URL for the downloaded web page so as to remove it from the queue (334). This process repeats until the web crawl completes.

Figure 4A:
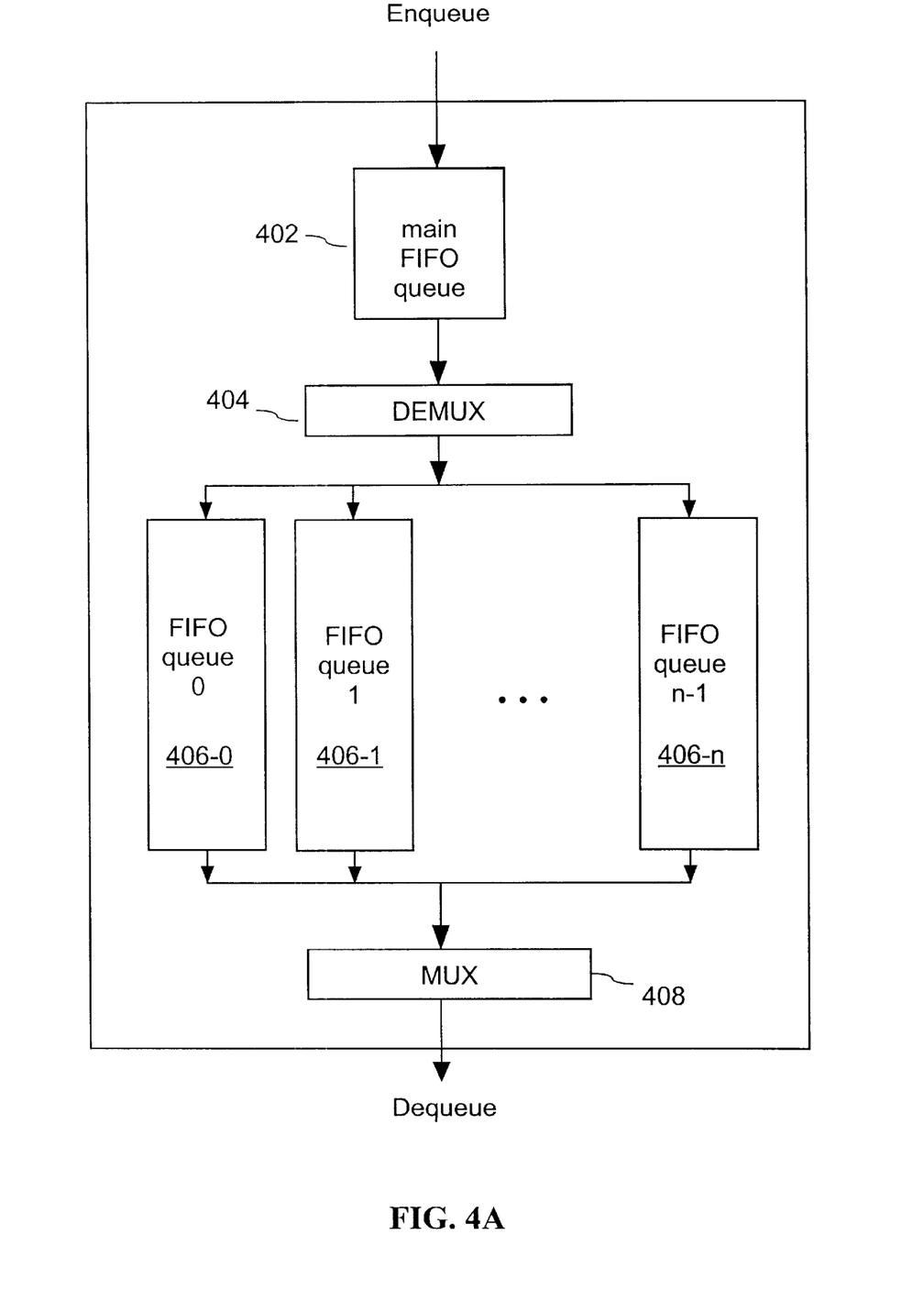
FIG. 4A is a block diagram of an exemplary embodiment of the invention.

FIG. 4A illustrates a second embodiment of the present invention. In this embodiment, there is a main FIFO queue 402, a demultiplexer procedure (demux) 404, "n" FIFO queues 406 and a multiplexer procedure (mux) 408. When a new URL is discovered, it is typically enqueued in the main FIFO queue 402. However, if the main FIFO queue 402 is empty, the new URL is not necessarily stored in the main FIFO queue 402; instead, it may be enqueued in one of the queues 406 by the demux 404. The demux 404 dynamically enqueues the new URL in an appropriate queue 406 according to a host-to-queue assignment table 132, based on the host identifier of the new URL. The host-to-queue assignment table 132 is used to guarantee that each queue is homogenous, i.e., that each queue contains URL's having the same host name component. When a thread is ready to dequeue a URL from a queue 406 the head URL in a queue assigned to the thread passes through the mux 408 and is dequeued from the queue. The corresponding web page of the dequeued URL is downloaded and processed. Subsequent to downloading the web page, the thread requests the next URL in the queue assigned to that thread.

Figure 4B:
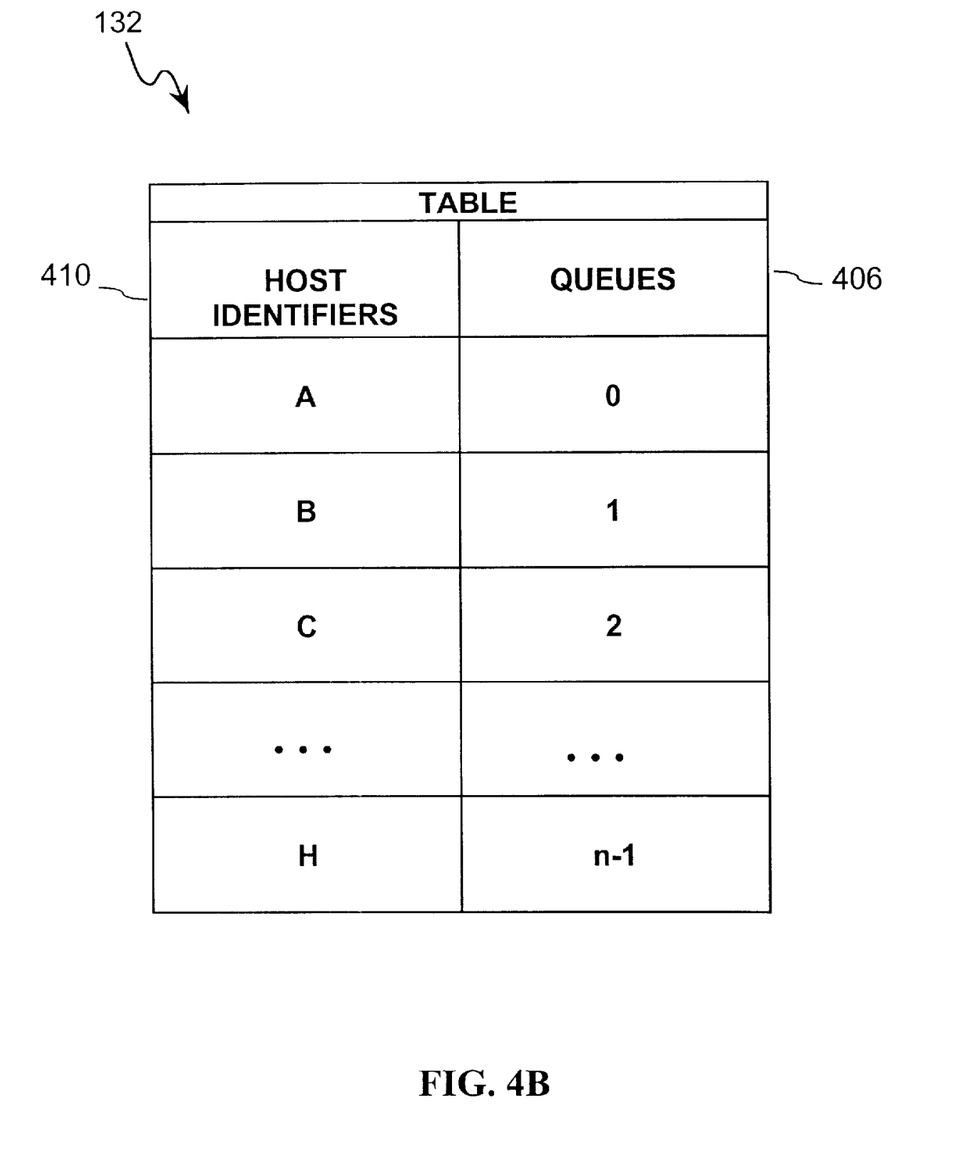
FIG. 4B is a table illustrating an exemplary embodiment in more detail.

FIG. 4B illustrates an exemplary embodiment of the host-to-queue assignment table 132. The host-to-queue assignment table 132 is updated when a host identifier is assigned to a queue or when the association of a host identifier is removed from a queue. Each queue may be dynamically reassigned to a new host identifier after all URL's in the queue have been processed. The operations that must be supported by on the table 132 are: 1) return the identifier of the queue associated with a given host (or an error value if there is none), 2) add a <host,queue identifier> pair to the table, and 3) remove the <host,queue identifier> pair in the table for a given queue identifier.

Figure 5:
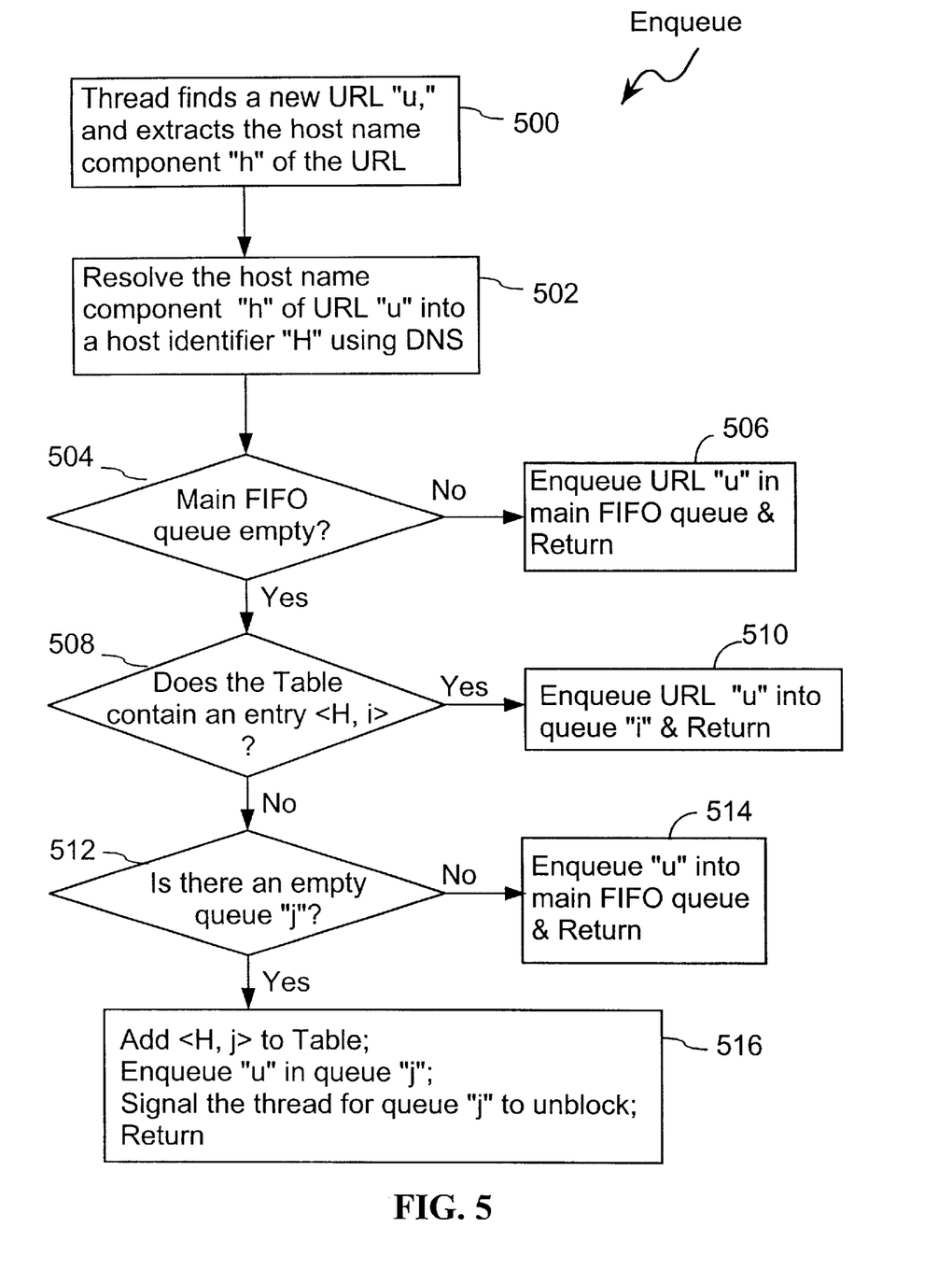
FIGS. 5, 6A and 6B are flow charts depicting a second exemplary embodiment of the invention.
Figure 6A:
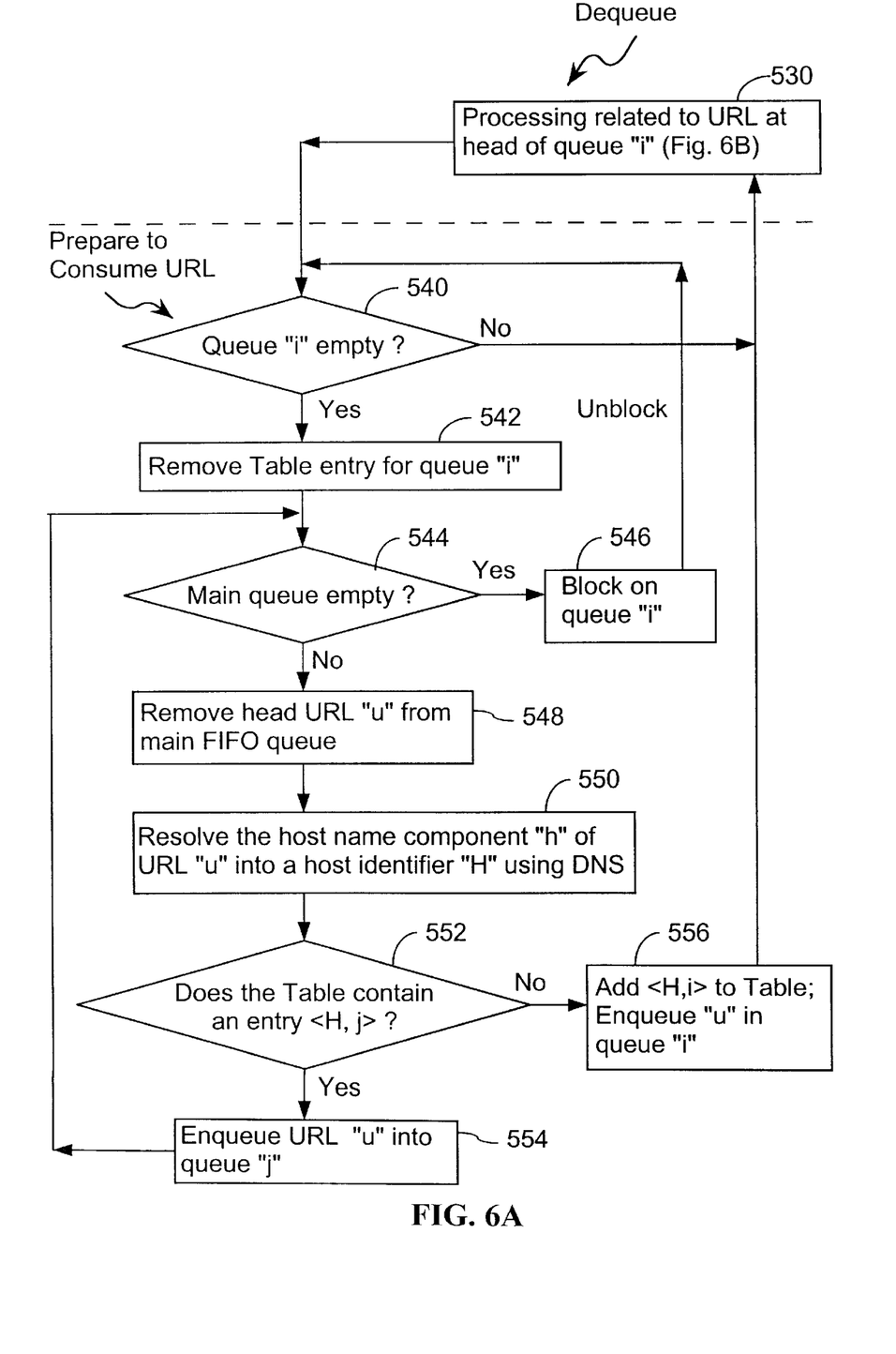
Figure 6B:
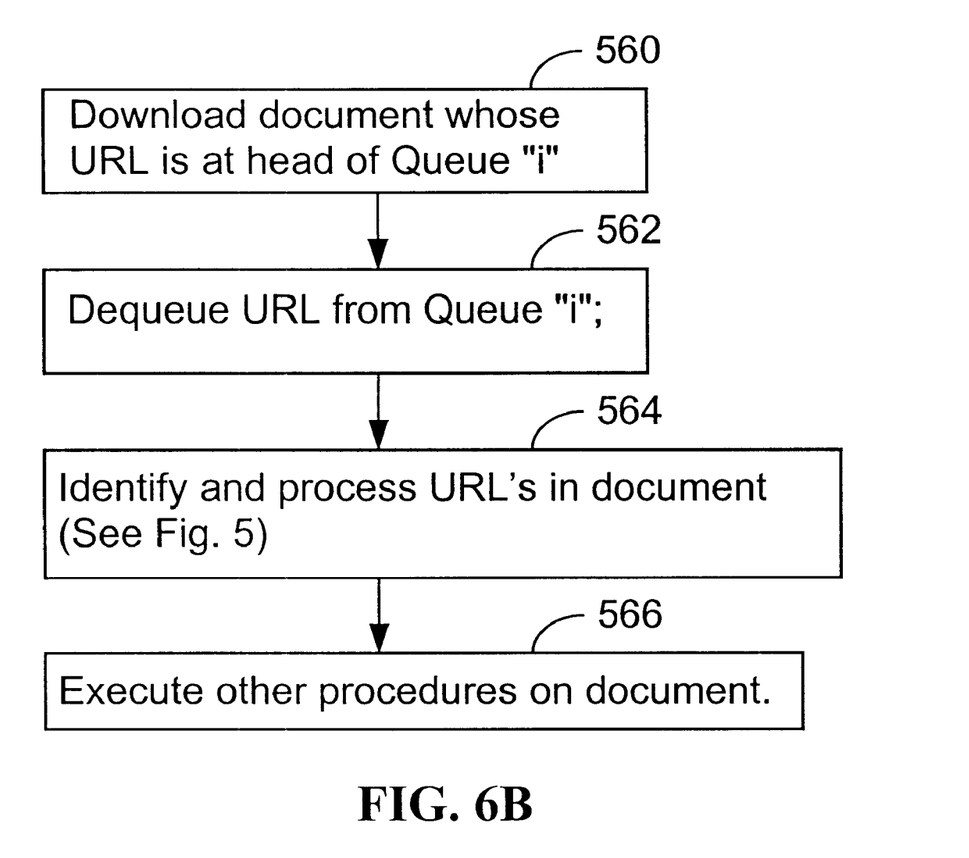

FIGS. 5 and 6 are flow charts of the second exemplary embodiment of the present invention. In particular, the flow chart in FIG. 5 illustrates the enqueue operation, corresponding to the demux procedure 404 shown in FIG. 4A, which is the procedure used by each of the threads to store new URL's discovered while processing downloaded web pages. In the following explanations, threads and queues are both identified by numerical ID's. For example, when the thread with ID "i" invokes the "dequeue" operation, the first item of the underlying queue "i" is dequeued and processed.

Referring to FIG. 5, while processing a downloaded web page, a thread will determine whether the URL in each link in the page is a known URL, which has already been enqueued and/or processed by the web crawler, or a new URL, which has not yet been enqueued or processed by the web crawler. When a thread discovers a new URL "u," it extracts the host name component "h" from the URL (step 500). The host name component "h" of the URL "u" is resolved into a host identifier "H" using the domain name system 114 (step 502). The thread then determines whether the main FIFO queue 402 is empty (step 504). If the main FIFO queue 402 is not empty, the URL "u" is enqueued into the main FIFO queue 402 (step 506) and then the enqueue procedure exits. The process for moving URL's from the main FIFO queue into the underlying queues is described later.

If the main FIFO queue 402 is empty (504-Yes), the thread searches the table 132 for an entry assigning "H" to any of the queues (step 508). If such an entry is found, the new URL "u" is enqueued into the queue "i" to which host address "H" is assigned, and the thread returns (step 510). If such an entry does not exist, the thread searches for an empty queue "j" (step 512). If there is no empty queue, the URL "u" is enqueued into the main FIFO queue 402 and the thread returns (step 514). If an empty queue "j" is found, "H" is assigned to queue "j", table 132 is updated with the new assignment, the URL "u" is enqueued into the queue "j", any thread blocked on queue "j" is signaled that the queue is no longer empty, and the thread returns (step 516).

FIGS. 6A and 6B contain a flow chart of the "consume URL" procedure performed by each thread in the exemplary embodiment to dequeue and process the URL's in the queues. This procedure corresponds to the mux procedure 408 shown in FIG. 4A. As part of this procedure, a thread moves URL's from the main queue to the underlying queues whenever the queue assigned to the thread becomes empty, because all the URL's in the queue have been processed and dequeued. The procedure shown in FIGS. 6A and 6B is performed continuously by each of the "n" threads of the web crawler. The enqueue procedure, discussed above and shown in FIG. 5, is performed while processing a downloaded web page (see step 564 of FIG. 6B).

The "consume URL" procedure has two main portions, a "prepare to consume" stage, which makes sure that the underlying queue "i" for thread "i" has at least one URL to process, and a URL processing and dequeuing stage. The prepare to consume stage of the procedure begins by checking whether queue "i," which is the queue associated with a particular thread, is empty (step 540). If the queue is not empty, the prepare to consume stage is completed, and the URL at the head of queue "i" is processed (530). In particular, referring to FIG. 6B, the web page for the URL is downloaded (560), and upon successful downloading the URL is dequeued, and thus removed, from queue "i" (562). The thread determines if the downloaded page includes URL's not previously encountered by the web crawler, and enqueues those URL's using the procedure described above (564). The downloaded page may also be processed by additional applications (566), such as a document indexer.

If queue "i" is empty (540-Yes), thread "i" removes the Table entry for queue "i" because there is no longer a host associated with queue "i" (step 542), and then checks to see if the main FIFO queue 402 is empty (544). If the main FIFO queue 402 is empty (544-Yes), the thread blocks until it receives a signal that queue "i" is no longer empty (546). Once the thread has been signaled and thereby unblocked, the thread returns to step 530 to process the URL at the head of queue "i."

If the main FIFO queue 402 is not empty (544-No), the head URL "u" in the main FIFO queue 402 is removed (step 548). The host name "h" of the URL "u" is resolved into a host identifier "H" using the domain name system 114 (step 550). If there is an entry in the host-to-queue assignment table 132 (FIG. 4B) such that "H" is the assigned host identifier for a queue "j" (step 552), the URL "u" is enqueued into the queue "j" (step 554) and the thread goes back to step 544 to process the next URL (if any) in the main FIFO. If there is not an entry in the table 132 that maps host identifier "H" to a queue "j" (552-No), "H" is assigned to queue "i" (step 556). In particular, the table 132 is updated with the new assignment and the URL "u" is enqueued into queue "i" (556). The thread returns to step 530 to process the head URL in queue "i."

In the first exemplary embodiment, when crawling in a network with a relatively small number of host computers, such as in an Intranet, some queues may be empty while other queues may contain URL's for multiple server hosts.

Thus, in the first embodiment, parallelism may not be efficiently maintained, since the threads associated with the empty queues will be idle. The second embodiment described makes better use of thread capacity, on average, by dynamically reassigning queues to whichever hosts have pages that need processing.

Both the first and second exemplary embodiments can be modified so as to utilize more queues than threads. In these modified embodiments, there is still a single, fixed thread assigned to dequeue from each queue, but because there are more queues than threads, each thread will dequeue from a plurality of queues. In such cases, a variety of policies can be used to control the order in which each thread dequeues from its assigned queues. For example, each thread could process its queues in round-robin order, or each thread could dequeue from the first non-empty queue in its assigned queue set.

The foregoing examples illustrate certain exemplary embodiments of the invention from which other embodiments, variations and modifications will be apparent to those skilled in the art. The invention should therefore not be limited to the particular exemplary embodiments discussed herein, but rather defined by the claims appended hereto.

What is claimed is:

1. A method of downloading data sets from among a plurality of host computers, comprising:

(a) obtaining at least one referring data set that includes addresses of one or more referred data sets; each referred data set address including a host address, the host address comprising a network address of a respective host computer of the plurality of host computers;

(b) enqueuing the referred data set addresses in a plurality of queues, including enqueuing those of the referred data set addresses sharing a respective common host address into a respective common one of the queues;

(c) from each of the queues, dequeuing a single, respective referred data set address; and (d) substantially concurrently downloading the referred data sets corresponding to the dequeued referred data set addresses from locations in the host computers specified by the dequeued referred data set addresses, the host address included in each dequeued referred data set address comprising the network address of the respective host computer from which the respective referred data set is to be downloaded;

(e) repeating steps (c) and (d) with respect to any one of the queues only after the referred data set corresponding to the dequeued referred data set address from the one queue has been downloaded;

whereby referred data sets corresponding to referred data set addresses from different ones of the queues are downloaded substantially concurrently, while referred data sets corresponding to referred data set addresses from any single one of the queues are downloaded one at a time.

2. The method of claim 1, further comprising:

establishing a plurality of threads; and associating with each respective queue a single one of the threads for processing the referred data set addresses enqueued in that queue;

wherein, the method includes processing each respective queue, including said dequeuing and downloading steps, using the one thread associated therewith.

3. The method of claim 2, further comprising performing at least one processing function on each downloaded referred data set;

wherein said repeating step (e) comprises repeating said dequeuing, downloading and processing steps with respect to any one of the queues only after the referred data set corresponding to the dequeued referred data set address from the one queue has been downloaded and processed.

4. The method of claim 2, wherein there are at least as many queues as threads.

5. The method of claim 1, further comprising iteratively downloading additional data sets by:
   (i) using at least one of the downloaded referred data sets of step (d) as a new referring data set for step (a); and
   (ii) repeating steps (a) through (d).

6. The method of claim 5, wherein the data sets include web pages and the data set addresses include uniform resource locators.

7. The method of claim 6, wherein each of the queues is a first-in-first-out queue.

8. The method of claim 1, wherein the data sets include web pages and the data set addresses include uniform resource locators.

9. The method of claim 1, wherein said step (b) of enqueuing the referred data set addresses includes:
   (b1) calculating a fingerprint for each referred data set address based on at least part of the host address included in the referred data set address, such that the fingerprints calculated for all referred data set addresses having a same host address are identical; and
   (b2) associating the address with one of the queues based on the fingerprint.

10. The method of claim 9, wherein:
   (i) the plurality of queues comprises N queues, each of the queues having an associated numerical identifier; and
   (ii) step (b2) includes assigning each referred data set address to the queue having a numerical identifier equal to the referred data set address fingerprint modulo N.

11. The method of claim 1, where step (b) includes:
   (b1) enqueuing the referred data set addresses into a main queue;
   (b2) dynamically assigning a host to each of said plurality of queues;
   (b3) enqueuing said referred data set addresses from said main queue into said queues according to said assignment; and
   (b4) assigning a new host any one of said plurality of queues when said one queue becomes empty.

12. The method of claim 1, wherein when one of the queues is empty, the associated thread is blocked until additional referred data set addresses are enqueued in said one queue.

13. A computer program product for use in conjunction with a computer system, the computer program product comprising a computer readable storage medium and a computer program mechanism embedded therein, the computer program mechanism comprising:
   an enqueuing module that, when executed by the computer system, obtains at least one referring data set that includes addresses of one or more referred data sets, each referred data set address including a host address corresponding to a host computer, and enqueues the referred data set addresses in a plurality of queues, including enqueuing those of the referred data set addresses sharing a respective common host address into a respective common one of the queues, the host address comprising a network address of a respective host computer of the plurality of host computers; and
   a dequeuing module that, when executed by a set of threads of the computer system, processes the referred data set addresses in each of the queues; the dequeuing module including instructions that, when executed by a respective one of the threads, perform the functions of identifying a single referred data set address in a corresponding respective one of the queues, downloading the single referred data set corresponding to the identified referred data set address from a location in a host computer specified by the identified referred data set address, dequeuing the referred data set address from the corresponding respective one of the queues, and repeating the downloading and dequeuing functions with respect to a next referred data set address in the one queue only after the downloading of the single referred data set and the dequeuing of the single referred data set address have been completed;
   whereby referred data sets corresponding to referred data set addresses from different ones of the queues are downloaded substantially concurrently, while referred data sets corresponding to referred data set addresses from any single one of the queues are downloaded one at a time.

14. The computer program product of claim 13, wherein the dequeuing module associates each respective queue with a single one of the threads for processing the referred data set addresses enqueued in that queue.

15. The computer program product of claim 14, wherein the dequeuing module includes instructions for initiating at least one processing function on each downloaded referred data set, and instructions for repeating the downloading, dequeuing and processing functions with respect to said next referred data set address in the one queue only after the referred data set corresponding to the dequeued referred data set address from the one queue has been downloaded and processed.

16. The computer program product of claim 14, wherein there are at least as many queues as threads.

17. The computer program product of claim 13, wherein said enqueuing module is configured to use at least one of the downloaded referred data sets as a new referring data set.

18. The computer program product of claim 17, the data sets include web pages and the data set addresses include uniform resource locators.

19. The computer program product of claim 18, wherein each of the queues is a first-in-first-out queue.

20. The computer program product of claim 13, wherein the data sets include web pages and the data set addresses include uniform resource locators.

21. The computer program product of claim 13, wherein said enqueuing module includes instructions for calculating a fingerprint for each referred data set address based on at least part of the host address included in the referred data set address, such that the fingerprints calculated for all referred data set addresses having a same host address are identical, and associating the referred data set address with one of the queues based on the fingerprint.

22. The computer program product of claim 21, wherein the plurality of queues comprises N queues, each of the queues having an associated numerical identifier; and said enqueuing module assigns each referred data set address to the queue having a numerical identifier equal to the referred data set address fingerprint modulo N.

23. The computer program product of claim 13, wherein the enqueuing module enqueues the referred data set addresses into a main queue, dynamically assigns a host to each of said plurality of queues; enqueuing said referred data set addresses from said main queue into said queues according to said assignment; and assigns a new host any one of said plurality of queues when said one queue becomes empty.

24. The computer program product of claim 13, wherein the dequeuing module includes instructions for blocking execution of the thread associated with one of the queues when the one queue is empty until additional referred data set addresses are enqueued in said one queue.

25. A web crawler for downloading data sets from among a plurality of host computers, comprising:

at least one central processing unit;

a plurality of threads of execution that are executed by the at least one central processing unit;

memory for storing a plurality of queues;

an enqueuing module, executed by each of the plurality of threads, that obtains at least one referring data set that includes addresses of one or more referred data sets, each referred data set address including a host address corresponding to a host computer, and enqueues the referred data set addresses in the plurality of queues, including enqueuing those of the referred data set addresses sharing a respective common host address into a respective common one of the queues, the host address comprising a network address of a respective host computer of the plurality of host computers; and a dequeuing module, that when executed by the plurality of threads, processes the referred data set addresses in each of the queues; the dequeuing module including instructions that, when executed by a respective one of the threads, perform the functions of identifying a single referred data set address in a corresponding respective one of the queues, downloading the single referred data set corresponding to the identified referred data set address from a location in a host computer specified by the identified referred data set address, dequeuing the referred data set address from the corresponding respective one of the queues, and repeating the downloading and dequeuing functions with respect to a next referred data set address in the one queue only after the downloading of the single referred data set and the dequeuing of the single referred data set address have been completed;

whereby referred data sets corresponding to referred data set addresses from different ones of the queues are downloaded substantially concurrently, while referred data sets corresponding to referred data set addresses from any single one of the queues are downloaded one at a time.

26. The web crawler of claim 25, wherein the dequeuing module associates each respective queue with a single one of the threads for processing the referred data set addresses enqueued in that queue.

27. The web crawler of claim 26, wherein the dequeuing module includes instructions for initiating at least one processing function on each downloaded referred data set, and instructions for repeating the downloading, dequeuing and processing functions with respect to said next referred data set address in the one queue only after the referred data set corresponding to the dequeued referred data set address from the one queue has been downloaded and processed.

28. The web crawler of claim 27, wherein there are at least as many queues as threads.

29. The web crawler of claim 25, wherein said enqueuing module is configured to use at least one of the downloaded referred data sets as a new referring data set.

30. The web crawler of claim 25, wherein the data sets include web pages and the data set addresses include uniform resource locators.

31. The web crawler of claim 30, wherein each of the queues is a first-in-first-out queue.

32. The web crawler of claim 25, wherein the data sets include web pages and the data set addresses include uniform resource locators.

33. The web crawler of claim 25, wherein said enqueuing module includes instructions for calculating a fingerprint for each referred data set address based on at least part of the host address included in the referred data set address, such that the fingerprints calculated for all referred data set addresses having a same host address are identical, and associating the address with one of the queues based on the fingerprint.

34. The web crawler of claim 33, wherein the plurality of queues comprises N queues, each of the queues having an associated numerical identifier; and said enqueuing module assigns each referred data set address to the queue having a numerical identifier equal to the referred data set address fingerprint modulo N.

35. The web crawler of claim 25, wherein the enqueuing module enqueues the referred data set addresses into a main queue, dynamically assigns a host to each of said plurality of queues; enqueuing said referred data set addresses from said main queue into said queues according to said assignment; and assigns a new host any one of said plurality of queues when said one queue becomes empty.

36. The web crawler of claim 25, wherein the dequeuing module includes instructions for blocking execution of the thread associated with one of the queues when the one queue is empty until additional referred data set addresses are enqueued in said one queue.

* * * * *